(12) United States Patent
Chen

(10) Patent No.: US 8,767,415 B2
(45) Date of Patent: *Jul. 1, 2014

(54) HIGH EFFICIENCY AND FAST RESPONSE AC-DC VOLTAGE CONVERTERS

(71) Applicant: Silergy Semiconductor Technology (Hangzhou) Ltd, Hangzhou (CN)

(72) Inventor: Wei Chen, Saratoga, CA (US)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,349

(22) Filed: Jan. 27, 2014

(65) Prior Publication Data

US 2014/0140105 A1    May 22, 2014

Related U.S. Application Data

(63) Continuation of application No. 13/855,909, filed on Apr. 3, 2013, now Pat. No. 8,687,382.

(30) Foreign Application Priority Data

Jun. 6, 2012    (CN) .......................... 2012 1 0188848

(51) Int. Cl.
*H02M 3/335*    (2006.01)
(52) U.S. Cl.
USPC .............................. 363/16; 363/21.07; 363/67
(58) Field of Classification Search
USPC ..................................... 363/16–21.18, 65–72
See application file for complete search history.

(56) References Cited

U.S. PATENT DOCUMENTS

| | | | |
|---|---|---|---|
| 5,541,827 A * | 7/1996 | Allfather ......................... | 363/17 |
| 6,101,108 A | 8/2000 | Wittenbreder, Jr. | |
| 7,619,907 B2 * | 11/2009 | Urakabe et al. ................. | 363/37 |
| 7,768,801 B2 | 8/2010 | Usui et al. | |
| 7,782,635 B2 | 8/2010 | Duvnjak | |
| 8,009,443 B2 * | 8/2011 | Krause ........................... | 363/17 |
| 8,040,696 B2 | 10/2011 | Wu et al. | |

FOREIGN PATENT DOCUMENTS

CN        102427293 A    4/2012

* cited by examiner

*Primary Examiner* — Jessica Han
(74) *Attorney, Agent, or Firm* — Michael C. Stephens, Jr.

(57) ABSTRACT

The present invention discloses circuits and methods for high efficiency and fast response AC-DC voltage converters. In one embodiment, an AC-DC voltage converter can include: (i) a first stage voltage converter having an isolated topology with a power factor correction function, where the first stage voltage converter is configured to convert an AC input voltage to a series-connected N branches of first stage voltages, where N is a positive integer of at least two; (ii) a second stage voltage converter having a non-isolated topology, where the second stage voltage converter is configured to convert one of the N branches of the first stage voltages to a second stage voltage; and (iii) where the second stage voltage and a remaining of the N branches of the first stage voltages are configured to be series-connected and converted to a DC output voltage.

11 Claims, 5 Drawing Sheets

US 8,767,415 B2

HIGH EFFICIENCY AND FAST RESPONSE AC-DC VOLTAGE CONVERTERS

RELATED APPLICATIONS

This application is a continuation of the following application, U.S. patent application Ser. No. 13/855,909, filed on Apr. 3, 2013, now issued as U.S. Pat. No. 8,687,382, and which is hereby incorporated by reference as if it is set forth in full in this specification, and which also claims the benefit of Chinese Patent Application No. 201210188848.2, filed on Jun. 6, 2012, which is incorporated herein by reference in its entirety.

FIELD OF THE INVENTION

The present invention relates to the field of switch mode power supplies, and more specifically to high efficiency and fast response AC-DC voltage converters.

BACKGROUND

AC-DC converters are typically used in various electronics devices to convert an AC voltage level to one or more regulated DC voltage levels. Such converters may utilize power factor correction (PFC) and/or pulse-width modulation (PWM) circuitry in order to control the regulated levels, and to improve the conversion efficiency. Among the concerns in AC-DC voltage converter designs are circuit power losses, transmission efficiency, overall product costs, circuit volume, and regulation precision.

SUMMARY

Particular embodiments can provide high efficiency and fast response AC-DC voltage converters.

In one embodiment, an AC-DC voltage converter configured to convert an AC input voltage to a DC output voltage, can include: (i) a first stage voltage converter having an isolated topology with a power factor correction function, where the first stage voltage converter is configured to convert the AC input voltage to a series-connected N branches of first stage voltages, where N is a positive integer of at least two; (ii) a second stage voltage converter having a non-isolated topology, where the second stage voltage converter is configured to convert one of the N branches of the first stage voltages to a second stage voltage; and (iii) where the second stage voltage and a remaining of the N branches of the first stage voltages are configured to be series-connected and converted to the DC output voltage at an output terminal of the AC-DC voltage converter.

Embodiments of the present invention can advantageously provide several advantages over conventional approaches. For example, a second stage voltage converter may only need to convert part of an output voltage of a first stage voltage converter, so as to reduce overall circuit power losses and improve transmission efficiency. In addition, switches with relatively lower withstand voltages and smaller volumes can be utilized to reduce product costs and circuit volume. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
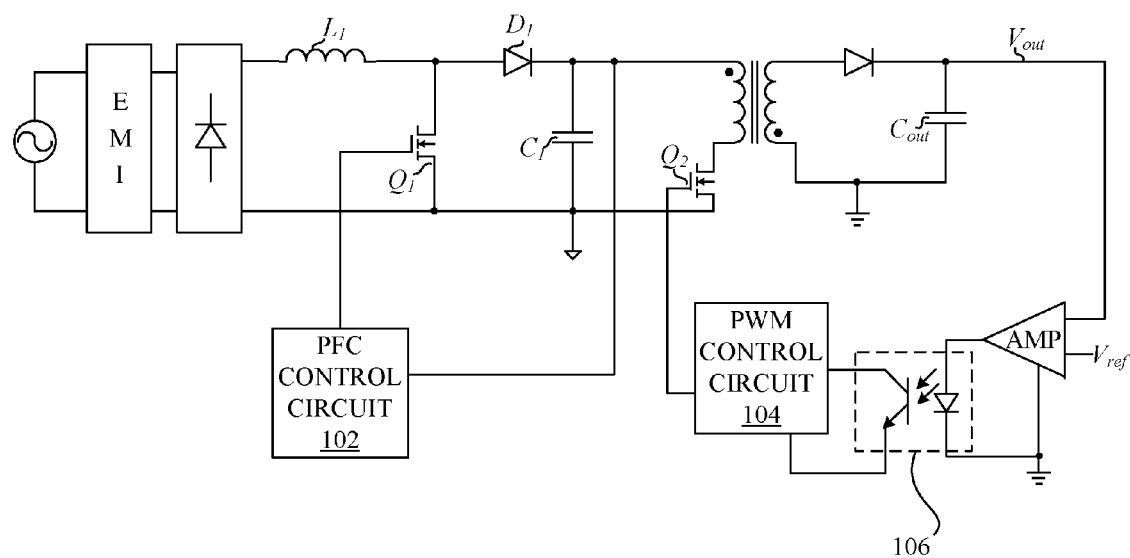
FIG. 1 is a block diagram of an example two-stage AC-DC voltage converter.

As shown in FIG. 1, an example two-stage structure used in AC-DC voltage converters can include a power factor correction (PFC) control circuit 102, pulse-width modulation (PWM) control circuit 104, optical coupler 106, and an isolated DC-DC converter. This "isolation" refers to the existence of an electrical barrier between the input and output of the DC-DC converter. The simplest example of a "non-isolated" converter is a three terminal linear regulator, where one terminal is used for and unregulated input, one terminal is used for the regulated output, and one terminal is for the common.

In this example, PFC control circuit 102 can be used to improve the power factor and the latter stage flyback converter can be used to transfer an output voltage of the first stage to the secondary-side through an isolated topology. However, with this topology, diode $D_1$, switch $Q_1$, switch $Q_2$, and capacitor $C_1$ should utilize devices with a high breakdown or "withstand" voltage. In addition, the overall product costs may be increased, and the circuit response may be slowed due to optical coupler 106.

Figure 2:
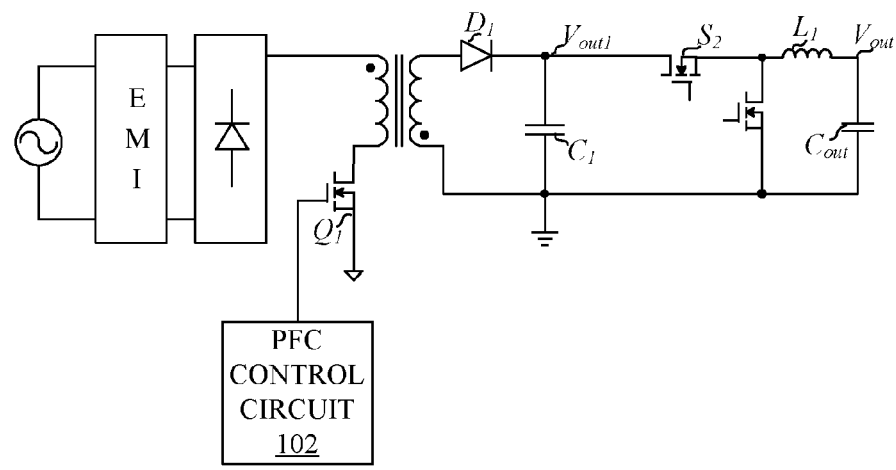
FIG. 2 is a block diagram of another example two-stage AC-DC voltage converter.

To overcome the disadvantages of the topology shown in FIG. 1, the example structure of FIG. 2 can be utilized. The structure of FIG. 2 can achieve power factor correction (e.g., via PFC control circuit 102), and may generate DC voltage $V_{out1}$ by using a flyback converter. Also, a non-isolated DC-DC converter can be used in the second stage circuit to convert DC voltage $V_{out1}$ to output voltage $V_{out}$. As compared to the circuit structure shown in FIG. 1, the structure of FIG. 2 may facilitate integration with only one high withstand voltage switch. Also, primary-side control applied without an optical coupler can reduce the overall product costs. However, drawbacks of this structure can include a second stage circuit that regulates the output voltage of the first stage circuit, possibly resulting in unnecessary power losses.

In particular embodiments, a high efficiency, fast response AC-DC voltage converter can include a two-stage structure to convert an AC input voltage to a constant DC output voltage, where the second stage voltage converter may only convert part of the output voltage of the first stage voltage converter. In this way, overall circuit power losses can be reduced, and the transmission efficiency can be improved. In addition, switches in the second stage voltage converter may only bear a portion of the output voltage of the first stage voltage converter, rather than the entire output voltage. Thus, switches with relatively lower withstand voltages and smaller volumes can be utilized in order to reduce product costs and circuit volume. Further, a control method of the second stage voltage converter can be a PWM control method with a relatively faster regulating speed. Also, the control circuit can receive the entire DC output voltage of the AC-DC voltage converter, rather than the output voltage of the second stage voltage converter, as feedback information. In this way, relatively fast and precise regulation of the output voltage of the entire converter can be achieved.

In one embodiment, an AC-DC voltage converter configured to convert an AC input voltage to a DC output voltage, can include: (i) a first stage voltage converter having an isolated topology with a power factor correction function, where the first stage voltage converter is configured to convert the AC input voltage to a series-connected N branches of first stage voltages, where N is a positive integer of at least two; (ii) a second stage voltage converter having a non-isolated topology, where the second stage voltage converter is configured to convert one of the N branches of the first stage voltages to a second stage voltage; and (iii) where the second stage voltage and a remaining of the N branches of the first stage voltages are configured to be series-connected and converted to the DC output voltage at an output terminal of the AC-DC voltage converter.

Figure 3:
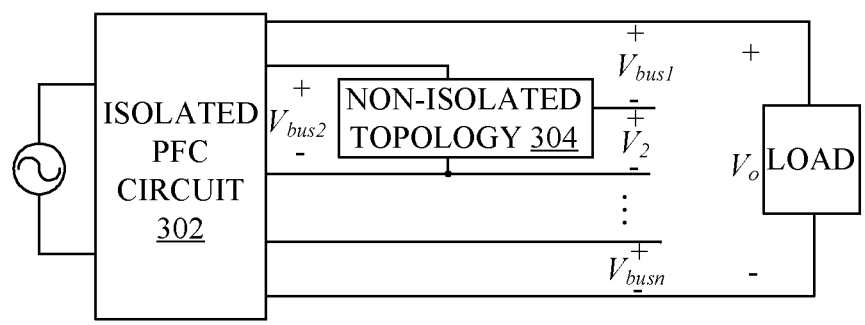
FIG. 3 is a block diagram of a first example AC-DC voltage converter in accordance with embodiments of the present invention.

Referring now to FIG. 3, shown is a first example AC-DC voltage converter in accordance with embodiments of the present invention. In this example, the AC-DC voltage converter used to convert an AC input voltage to a DC output voltage can include a first voltage converter 302 and a second voltage converter 304. In particular, the first voltage converter 302 can utilize an isolated topology with a function of power factor correction to convert the AC input voltage to a series-connected N branches of first stage voltages $V_{bus1}, V_{bus2}, \ldots V_{busn}$. For example, N can be a positive integer of at least two (e.g., 2, 3, 4, etc.).

The second voltage converter 304 can utilize non-isolated topology to one of the first stage voltages (e.g., $V_{bus2}$) to second stage voltage $V_2$. Also, the second stage voltage (e.g., $V_2$) can be series-connected with the remaining (N−1) branches of the first stage voltages. In this way, DC output voltage $V_o$ can be generated at an output terminal of the AC-DC voltage converter. For example, DC output voltage $V_o$ may be a sum of the second stage voltage (e.g., $V_2$) and the remaining (N−1) branches of the first stage voltages (e.g., $V_{bus1}, V_{bus3}, \ldots V_{busn}$). In particular embodiments, second stage voltage converter 304 of the AC-DC voltage converter may only need to convert part or one (e.g., $V_{bus2}$) of the series-connected output voltages of the first stage voltage converter. In this fashion, overall power losses can be reduced to improve conversion efficiency.

Figure 4:
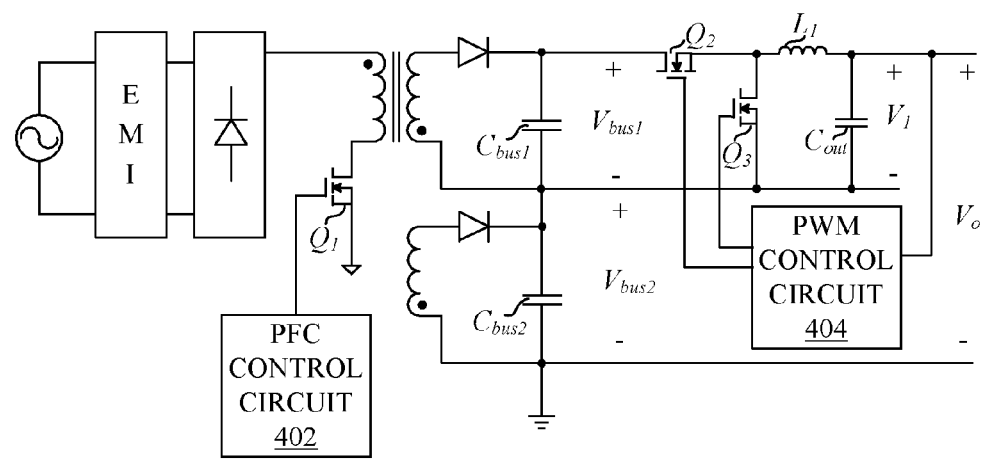
FIG. 4 is a block diagram of a second example AC-DC voltage converter in accordance with embodiments of the present invention.

Referring now to FIG. 4, shown is a second example AC-DC voltage converter in accordance with embodiments of the present invention. In this example, the first stage voltage converter can output two branches of first stage voltages (e.g., $V_{bus1}$ and $V_{bus2}$). Thus in this case, N=2 in this specific implementation of the AC-DC voltage converter. The first stage voltage converter can include a rectifier bridge, a flyback converter with two output channels, and power factor connection (PFC) control circuit 402.

The rectifier bridge can be used to convert the AC input voltage to a DC voltage, and may include electromagnetic interference (EMI) reduction circuitry. The flyback converter can connect with the rectifier bridge to receive the DC voltage, and to convert the DC voltage to series-connected first stage voltages $V_{bus1}$ and $V_{bus2}$. For example, PFC control circuit 402 can utilize a quasi-resonance method to control primary-side switch $Q_1$, so as to maintain the input voltage of the flyback converter as in phase with the input current.

In particular embodiments, the topology of the second stage voltage converter can be a non-isolated buck regulator that includes switch $Q_2$, switch $Q_3$, inductor $L_1$, and output capacitor $C_{out}$. The second stage voltage converter can receive first stage voltage $V_{bus1}$ output by the first stage voltage converter, and convert $V_{bus1}$ to second stage voltage $V_1$ using PWM control circuit 404. Series-connected second stage voltage $V_1$ and first stage voltage $V_{bus2}$ can be configured as output voltage $V_o$ of the AC-DC voltage converter.

The PWM control circuit can receive output voltage $V_o$ of the AC-DC voltage converter, and generate a PWM signal to control the duty cycles of switches $Q_2$ and $Q_3$ of the second stage voltage converter. In this particular example, because the switches in the second stage voltage converter may only bear a portion (e.g., $V_{bus1}$) of the output voltage of the first stage voltage converter, rather than the entire output voltage, switches $Q_2$ and $Q_3$ may have relatively low withstand voltage and relatively smaller volume. Thus, the product costs and circuit volume can be reduced.

Also, a control method of the second stage voltage converter can include a PWM control method that has a relatively fast regulating speed. In addition, the PWM control circuit can receive the full DC output voltage $V_o$ of the AC-DC voltage converter, instead of output voltage $V_1$ of the second stage voltage converter, as feedback information. In this way, output voltage $V_o$ of the entire converter can be regulated with increased speed and precision.

Figure 5:
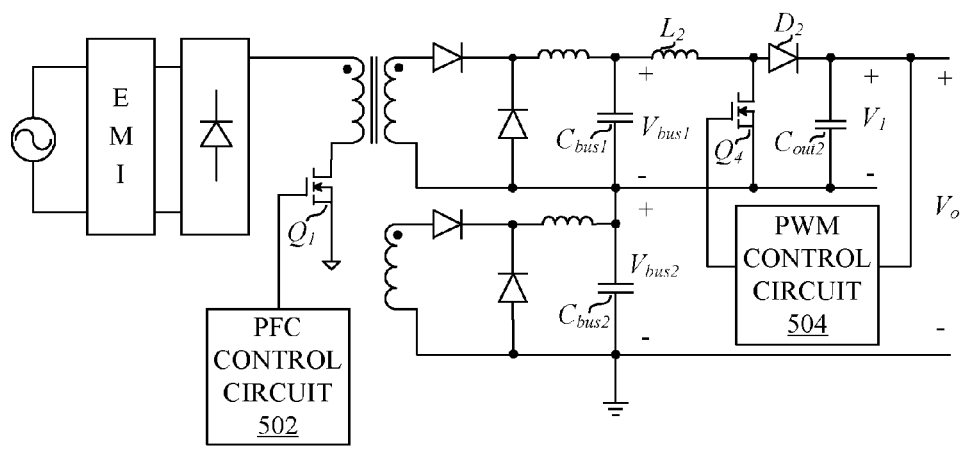
FIG. 5 is a block diagram of a third example AC-DC voltage converter in accordance with embodiments of the present invention.

Referring now to FIG. 5, shown is a block diagram of a third example AC-DC voltage converter in accordance with embodiments of the present invention. As compared to the example shown in FIG. 4, the multi-output isolated converter in the first stage voltage converter can include a forward converter. The first stage voltage converter can include a rectifier bridge, EMI reduction circuitry, a forward converter with two output channels, and PFC control circuit 502.

Also, a topology of the second stage voltage converter can include a non-isolated boost converter formed by switch $Q_4$, inductor $L_2$, diode $D_2$, and output capacitor $C_{out2}$. The specific working principle may be the same or similar to the example shown in FIG. 4. The forward converter can utilize a primary-side control method, where the operation state of the forward converter can be controlled by detecting the output voltage of the auxiliary winding.

The second stage voltage converter can be any appropriate non-isolated topology (e.g., non-isolated boost regulator, buck regulator, boost-buck regulator, etc.). For example, the second stage voltage converter shown in FIG. 4 can also be a non-synchronous buck regulator, and the second stage voltage converter shown in FIG. 5 can accordingly be a synchronous boost regulator. Thus, any suitable converters can be utilized in accordance with embodiments of the present invention.

The above has described some example embodiments of the present invention, but practitioners with ordinary skill in the art will also recognize that other techniques or circuit structures can also be applied in accordance with embodiments of the present invention. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An AC-DC voltage converter configured to convert an AC input voltage to a DC output voltage, the AC-DC voltage converter comprising:
   a) a first stage voltage converter configured to convert said AC input voltage to a series-connected N branches of first stage voltages, wherein N is a positive integer of at least two;
   b) a second stage voltage converter having a non-isolated topology, wherein said second stage voltage converter is configured to convert one of said N branches of said first stage voltages to a second stage voltage; and
   c) wherein said second stage voltage and a remaining of said N branches of said first stage voltages are configured to be series-connected and converted to said DC output voltage at an output terminal of said AC-DC voltage converter.

2. The AC-DC voltage converter of claim 1, wherein said second stage voltage converter comprises a pulse-width modulation (PWM) control circuit configured to receive said DC output voltage, and to generate a PWM signal configured to control duty cycles of switches in said second stage voltage converter to convert said one branch of said first stage voltages to said second stage voltage.

3. The AC-DC voltage converter of claim 1, wherein said first stage voltage converter comprises:
   a) a rectifier bridge configured to convert said AC input voltage to a DC input voltage;
   b) a multi-output isolated converter coupled to said rectifier bridge, wherein said multi-output isolated converter is configured to convert said DC input voltage to said series-connected N branches of said first stage voltages; and
   c) a power factor correction (PFC) control circuit configured to maintain said DC input voltage in a same phase as an input current of said PFC control circuit.

4. The AC-DC voltage converter of claim 3, wherein said multi-output isolated converter comprises one of: a forward converter and a flyback converter.

5. The AC-DC voltage converter of claim 3, wherein said multi-output isolated converter is controllable by a primary-side control method by detecting a voltage of an auxiliary winding of said multi-output isolated converter.

6. The AC-DC voltage converter of claim 3, wherein said PFC control circuit is configured to utilize a quasi-resonance control method to control a primary-side switch.

7. The AC-DC voltage converter of claim 1, wherein said non-isolated topology of said second stage voltage converter comprises at least one of: a non-isolated buck regulator, a non-isolated boost regulator, and a non-isolated boost-buck regulator.

8. The AC-DC voltage converter of claim 1, wherein said first stage voltage converter comprises electromagnetic interference (EMI) reduction circuitry.

9. The AC-DC voltage converter of claim 1, wherein said DC output voltage comprises a sum of said second stage voltage and said remaining of said N branches of said first stage voltages.

10. The AC-DC voltage converter of claim 1, wherein said second stage voltage converter comprises a non-synchronous buck regulator.

11. The AC-DC voltage converter of claim 1, wherein said second stage voltage converter comprises a synchronous boost regulator.

* * * * *